United States Patent [19]
Lamers et al.

[11] Patent Number: 5,800,299
[45] Date of Patent: Sep. 1, 1998

[54] CONTINUOUSLY VARIABLE TRANSMISSION

[75] Inventors: Gerardus Johannes Maria Lamers, Eindhoven; Johannes gerardus Ludovicus Maria Van Spijk, Drunen; Franciscus Cristianus Antonius Hubertus Willems, Hooge-Mierde, all of Netherlands

[73] Assignee: Van Doorne's Transmissie B.V., Tilburg, Netherlands

[21] Appl. No.: 627,071

[22] Filed: Apr. 3, 1996

[30]        Foreign Application Priority Data

Apr. 7, 1995 [NL] Netherlands ............................ 1000087

[51] Int. Cl.$^6$ .................................................. F16H 57/05
[52] U.S. Cl. .................................. 474/45; 474/91
[58] Field of Search ...................... 474/43, 45, 8, 474/91; 74/467; 184/6.12, 11.1, 13.1

[56]          References Cited

FOREIGN PATENT DOCUMENTS

| 0 315 816 | 5/1989 | European Pat. Off. . |
| 0 560 427 | 9/1993 | European Pat. Off. . |
| 347.915 | 3/1905 | France . |
| 248393 | 12/1926 | United Kingdom . |

*Primary Examiner*—Roger J. Schoeppel
*Attorney, Agent, or Firm*—Young & Thompson

[57]            ABSTRACT

The invention relates to a continuously variable transmission, consisting of at least a transmission housing which accommodates a pulley/drive belt unit, a hydraulic circuit, in particular for the control and/or lubrication of the transmission, and a fluid reservoir. The transmission housing and/or the hydraulic circuit are provided with a way of promoting the flow of fluid to the bottom of the transmission housing from the rest of the transmission housing.

15 Claims, 5 Drawing Sheets

CONTINUOUSLY VARIABLE TRANSMISSION

BACKGROUND OF THE INVENTION

1. Field of the Invention

The invention relates to a continuously variable transmission, consisting of at least a transmission housing which accommodates a pulley/drive belt unit, a hydraulic circuit, in particular for the control and/or the lubrication of the transmission, and a fluid reservoir.

2. Description of the Related Art

Such a continuously variable transmission is known from American Patent U.S. Pat. No. 5,334,108 and is used in, for example, motor vehicles, in which case the power of the engine is transmitted by way of the pulley/drive belt unit to the wheels of the motor vehicle. Such a transmission functions mainly in a fluid-rich environment and is generally provided with a hydraulic circuit in particular for the control and/or the lubrication of the transmission.

Although the known transmission is satisfactory per se, it is found that for good functioning of the transmission in certain operating conditions, and in order to prevent damage to the transmission, a considerable quantity of fluid is necessary, some of which goes into the transmission housing. Interaction between this fluid and the moving parts of the transmission disrupts the discharge of fluid to the fluid reservoir. Circulating large quantities of fluid in the transmission and the presence of excess fluid in the transmission housing limit the efficiency of the transmission.

The object of the invention is to overcome the abovementioned drawbacks and to provide a reliable continuously variable transmission with improved efficiency.

SUMMARY OF THE INVENTION

To this end, the continuously variable transmission according to the invention is characterized in that the transmission housing and/or the hydraulic circuit is provided with means for promoting the discharge of fluid from the hydraulic circuit and/or the transmission housing to the fluid reservoir. In this way an undesirable excess of fluid in the transmission housing is reduced or prevented, and less fluid need be circulated, with the result that the efficiency of the transmission improves.

In this case the means can be designed in such a way that they break through and/or influence the flow of fluid. The spread of fluid by the moving parts of the continuously variable transmission is consequently restricted and the discharge of fluid from the transmission housing improved. Moreover, the continuously variable transmission can be provided with a smaller total quantity of fluid, while the continuously variable transmission functions reliably with improved efficiency in all operating conditions.

According to a further development of the invention, the means are fitted at the position where the possibility of volume build-up of fluid exists. This ensures that fluid does not collect undesirably in "dead spaces" in the transmission housing.

In this case the means can comprise one or more additional discharge openings in the transmission housing, for example at the position of a pulley of the pulley/drive belt unit. Fluid collecting at the position of a pulley and/or threatening to spread through the transmission housing under the influence of the moving pulley can be discharged satisfactorily in this way.

In addition, a discharge opening can be provided directly above the fluid reservoir. The discharged fluid then passes directly into the fluid reservoir, so that it is immediately available for reuse.

The means can also comprise one or more grooves in the transmission housing. In this way the fluid can be guided to places in the transmission housing from which good discharge is possible.

In addition, the continuously variable transmission can be characterized in that the means permit counterflow of fluid in the opposite direction to the volume build-up of fluid. The fluid carried along by the moving parts of the continuously variable transmission to "dead spaces" elsewhere in the transmission housing can thus still flow away to the discharge openings.

The means can comprise a baffle plate, which baffle plate can be fitted in the fluid flow, preferably essentially parallel to or slightly traversing the direction of the fluid flow. In this way the fluid is forced in one desired direction, so that good discharge is possible, and in this way also an area which is screened off from the moving parts of the transmission is created, along which area fluid can flow to the discharge openings.

The baffle plate can preferably be fitted between the drive belt and the transmission housing, preferably at the place where the drive belt does not run over the pulleys, or between at least one pulley of the pulley/drive belt unit and the transmission housing. In this case the baffle plate can be formed in such a way that the baffle plate follows the contour of the pulley. At the abovementioned locations in the transmission housing the interaction between the collected fluid and the drive belt can be great without a baffle plate, but the baffle plates force the fluid in a desired direction, and the fluid can flow back through the screened-off spaces provided there.

According to another development, the means according to the invention can comprise a baffle plate which is fitted near an opening out of the hydraulic circuit. Said opening can be a discharge opening for fluid from the transmission housing. The baffle plate thus conveys the collected fluid into the discharge opening to the fluid reservoir and prevents the fluid from being carried along by the moving parts of the transmission and being spread by them. In addition, the opening can be a supply opening for fluid for lubrication of the drive belt. The fluid is thus prevented from atomizing when leaving the supply opening, and this helps to ensure that the fluid reaches the transmission housing slightly concentrated and in a controlled manner, so that better discharge is ensured.

The continuously variable transmission can also be characterized in that the means comprise a pump. In this way, for discharge, the collected fluid is pumped or sucked away from the transmission to the fluid reservoir by the pump through, for example, one or more discharge openings.

BRIEF DESCRIPTION OF THE DRAWINGS

The invention will be explained in greater detail with reference to the drawings, in which:

FIG. 2a shows a section view of an embodiment of the present invention;

DESCRIPTION OF THE PREFERRED EMBODIMENTS

Figure 1:
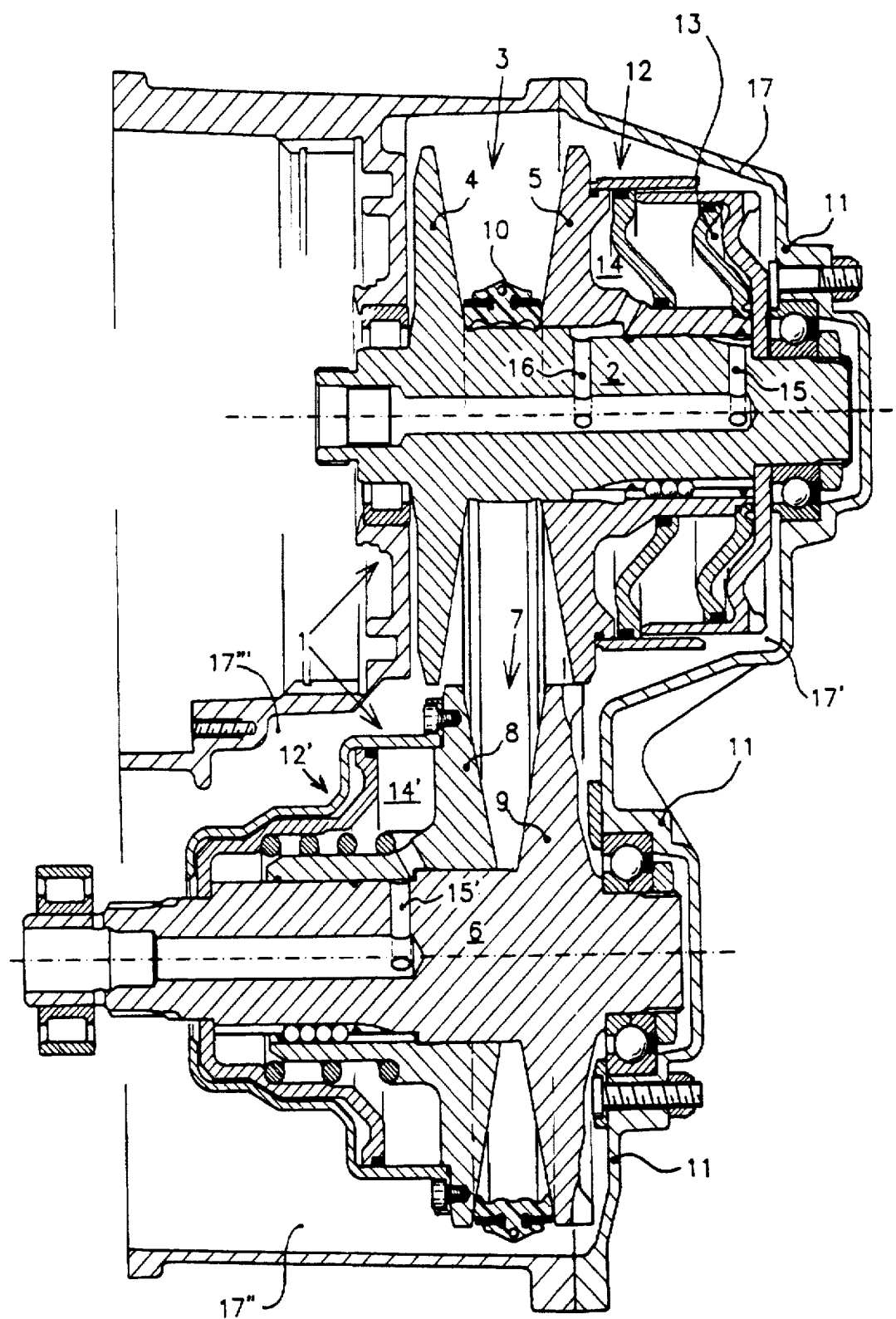
FIG. 1 shows a continuously variable transmission according to the prior art, illustrated in section.

FIG. 1 shows a continuously variable transmission according to the prior art. The continuously variable transmission comprises a transmission housing 11 which accommodates a pulley/drive belt unit 1. The pulley/drive belt unit 1 consists of an inward or primary pulley shaft 2 and an outward or secondary shaft 6. Fixed on the primary shaft 2 is a primary pulley 3, consisting of a fixed sheave 4 and an axially movable sheave 5. Fixed on the secondary shaft 6 is a secondary pulley 7, consisting of a fixed sheave 9 and an axially movable sheave 8. A drive belt 10 is placed on the pulleys 3 and 7. The movable sheaves 5, 8 have hydraulic movement means in the form of piston-cylinder units 12, 12' respectively. The radial positions of the drive belt 10 on the two pulleys 3 and 7 can be varied by means of the axial movement of the movable sheaves 5, 8 respectively over the pulley shafts 2, 6 respectively. For this purpose, fluid brought to pressure is conveyed through the passages 15, 16, 15' respectively from or to the pressure chambers 13, 14, 14' respectively. The abovementioned passages form part of a hydraulic circuit which is not shown in full.

For this purpose, the fluid, which can be, for example, an oil, is conveyed out of a fluid reservoir (not shown) into the hydraulic circuit. Apart from the adjustment of the movable sheaves 5 and 8, the fluid also serves other purposes, such as the lubrication or cooling of the moving parts of the continuously variable transmission, such as the pulleys 3 and 7 (sheaves and shafts), the drive belt 10 and the bearings. For this purpose, a large quantity of fluid must be circulated through the transmission. The fluid necessary for this is conveyed through the hydraulic circuit to the appropriate parts, following which the fluid passes into the transmission housing 11 and collects there.

It is desirable for the fluid which has collected in the transmission housing 11 to be discharged to the reservoir for reuse. According to the prior art, the transmission housing 11 is provided with an opening (not shown in the figure) for the discharge of fluid to the abovementioned reservoir. From the reservoir the fluid can be conveyed back into the hydraulic circuit for reuse.

The quantity of fluid which ultimately collects in the transmission housing 11 depends largely on the operating conditions of the continuously variable transmission.

During the changing-up of the continuously variable transmission a great supply of fluid from the reservoir and the hydraulic circuit to the transmission is necessary. As a result of this, a large quantity of fluid ultimately reaches the transmission housing 11, where it collects and from which it must be discharged.

In such operating conditions the collected fluid is spread in the transmission housing 11 by the moving, rotating parts of the continuously variable transmission. This interaction between the fluid and the moving parts of the continuously variable transmission results in hydrodynamic effects in the fluid. Moreover, the fluid is carried along to places in the transmission housing 11 where the fluid collects and from where satisfactory discharge and/or return flow to the discharge openings is not guaranteed. This accumulation of fluid in so-called "dead spaces", indicated here, for example, by 17–17'17"–17'", in the transmission housing 11, if no excess fluid is present, leads to a shortage of fluid in the reservoir and the hydraulic circuit for, inter alia, the piston-cylinder units 12 and 12', which adversely affects the control of the continuously variable transmission.

Figure 2:
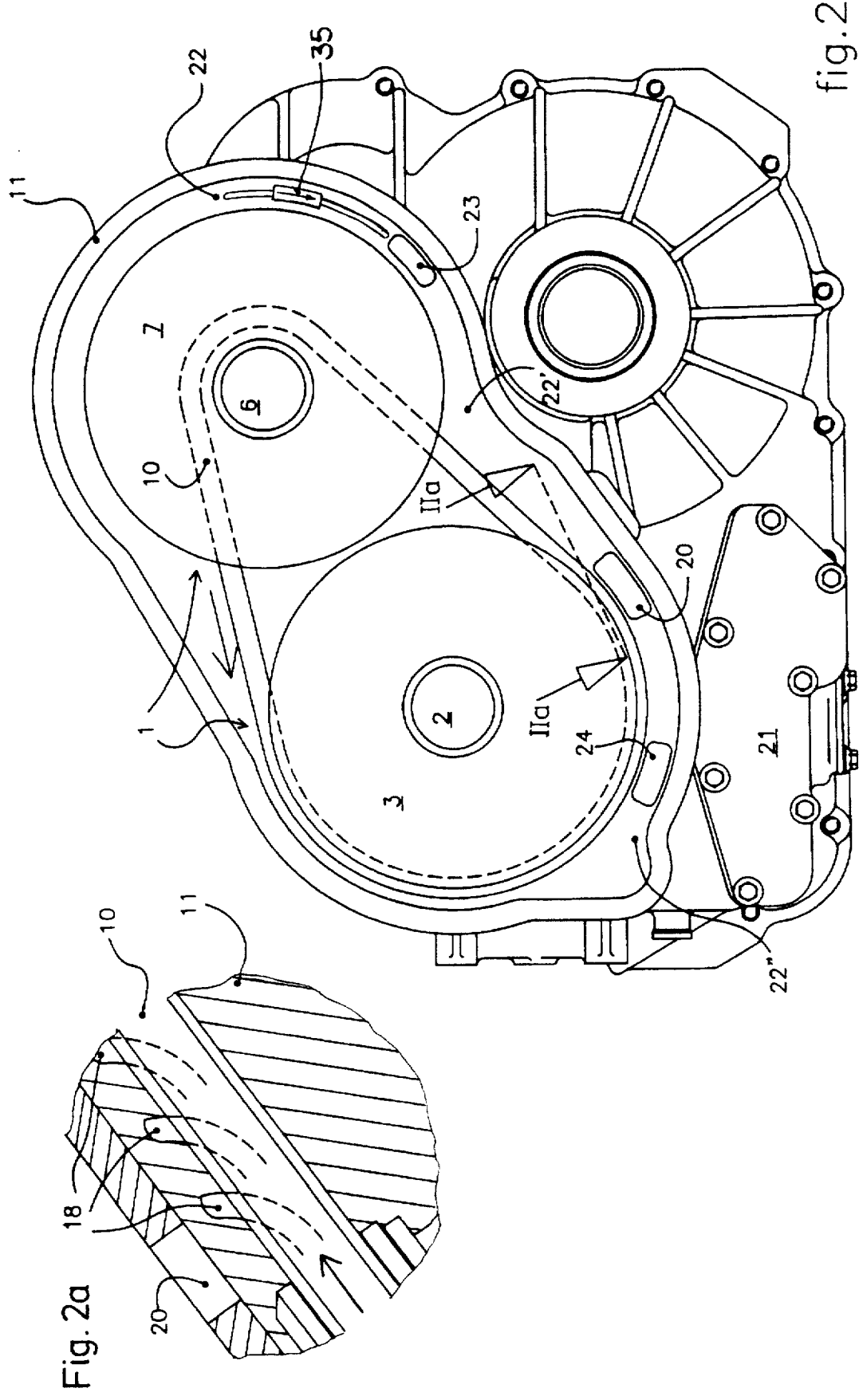
FIG. 2 shows an embodiment of a continuously variable transmission according to the invention, illustrated diagrammatically in side view.

FIG. 2 shows a side view of a continuously variable transmission according to the invention. The numbering of the parts shown corresponds to the numbering according to FIG. 1. In FIG. 2 the direction of rotation of the drive belt 10 is indicated by means of an arrow. FIG. 2 shows a transmission housing 11 which accommodates a pulley/drive belt unit 1, consisting of a primary pulley 3 placed on a primary shaft 2 and a secondary pulley 7 placed on a secondary shaft 6. A drive belt 10 is fitted over both pulleys 3 and 7. The fluid present in the transmission housing 11 can collect in the bottom of the transmission housing 11, from where the fluid is discharged to a fluid reservoir 21 by way of an opening 20 provided in the transmission housing 11 and forming part of the hydraulic circuit.

During the abovementioned operating conditions, the collected fluid is carried along by the pulleys 3 and 7 and the drive belt 10 as they move and spread through the transmission housing 11. Discharge of fluid from the transmission housing 11 through the discharge opening 20 to the reservoir 21 is thus rendered difficult. The fluid carried along collects elsewhere in the transmission housing 11 in "dead spaces", for example at the position of the secondary pulley 7 (spaces 22 and 22'), and at the position of space 22". An improvement in the discharge of fluid from the transmission housing 11 to the reservoir 21 is achieved by according to the invention providing discharge openings 23 and 24 which form part of the hydraulic circuit at places where the possibility of volume build-up exists, and thus a possible collection of fluid carried along occurs. The discharge openings 23 and 24 are provided here at the position of the secondary pulley 7 and the primary pulley 3 respectively. Also shown is a pump 35, with its direction of flow indicated by the arrow.

Volume build-up of fluid in the transmission housing 11 can also occur as a result of longitudinal and/or transverse accelerations which are created by the motor vehicle. The fluid can be moved through the transmission housing 11 and can collect elsewhere, for example during sudden braking such as an emergency stop or during acceleration of the motor vehicle under the influence of these acceleration forces. The discharge openings according to the invention can be provided at the place where fluid collects as the result of the abovementioned acceleration forces, for example in the front and/or in the rear of the transmission housing, viewed in the lengthwise direction of the motor vehicle. The discharge of fluid from the transmission housing 11 is improved in this way.

FIG. 2a also shows an enlarged detail A—A of the illustrated continuously variable transmission. This detail shows the drive belt 10, in which the arrow indicates the direction of rotation. The drive belt 10 runs at some distance from the bottom of the transmission housing 11. The fluid which has collected in the transmission housing 11 is carried along by the moving drive belt 10 in the direction of the secondary pulley 7 and can collect in "dead spaces". As a result of the grooves 18 provided according to the invention in the inside of the transmission housing 11, the fluid carried along is guided away from the moving drive belt 10 by way of these grooves to places elsewhere in the transmission, from where good discharge through, for example, the discharge opening 20 to the reservoir 21 is guaranteed. The grooves can also be provided in the transmission housing 11 at the position of the primary pulley 3 and the secondary pulley 7 respectively, so that the discharge of fluid through the discharge openings 24 and 23 respectively is improved.

Figure 3:
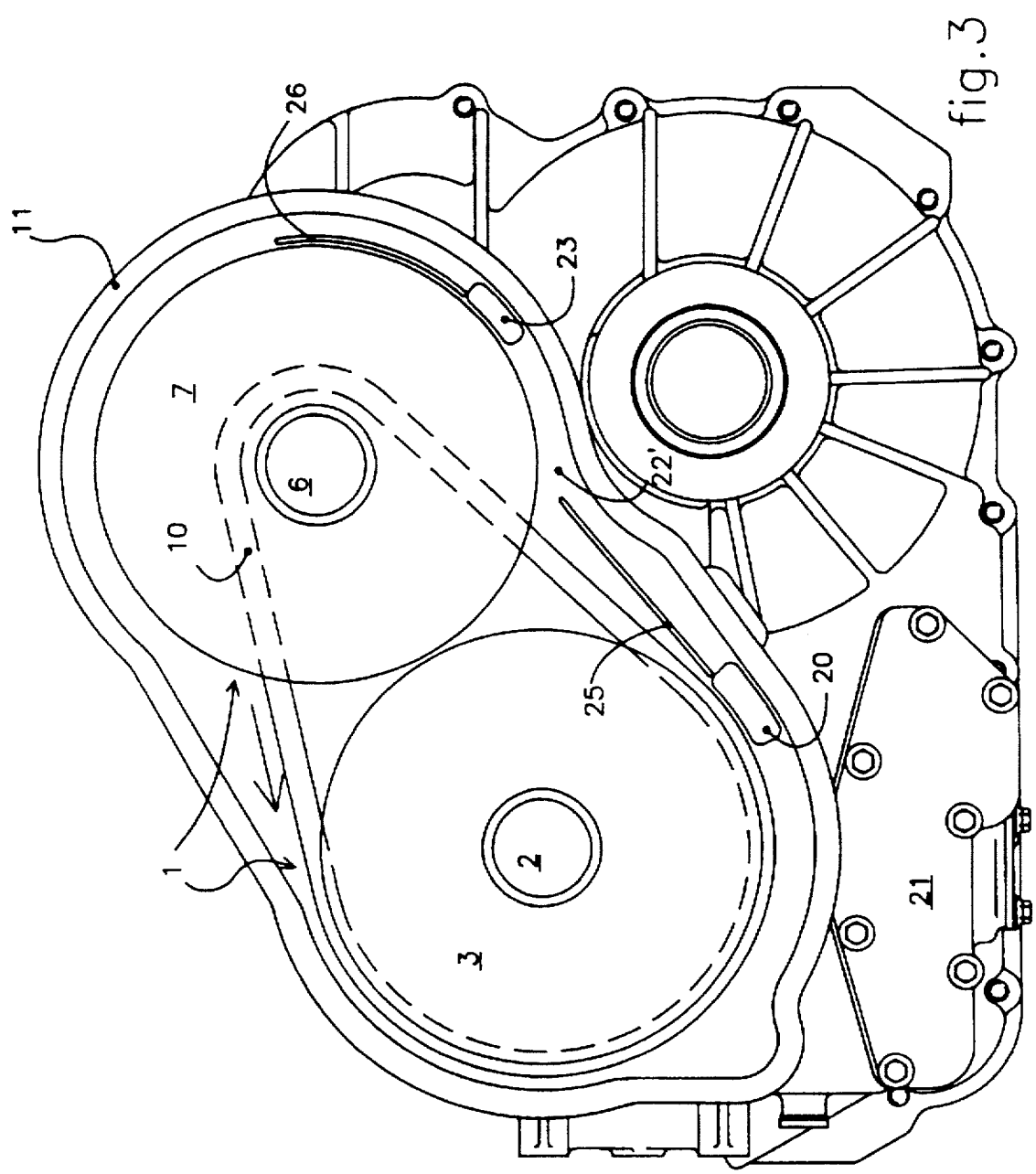
FIG. 3 shows a second embodiment of a continuously variable transmission according to the invention, illustrated diagrammatically in section and in side view.

FIG. 3 shows another embodiment of the invention. In this figure also the numbering of the parts is identical to the numbering of FIGS. 1 and 2. The fluid which has collected in the bottom of the transmission housing 11 is carried along by the primary pulley 3 and the drive belt 10 in the direction of the secondary pulley 7. This means that the fluid cannot be discharged through the discharge opening 20 to the reservoir 21.

The baffle plate 25 according to the invention screens off the fluid carried along from the moving parts of the continuously variable transmission, here the drive belt 10, so that counterflow of fluid is possible from "dead spaces", for example space 22', in the transmission housing 11, where fluid has collected or could collect, to the discharge opening 20. The baffle plate 26 according to the invention screens the fluid off from the secondary pulley 7, so that the fluid carried along can flow back to the discharge opening 23. The baffle plate 26 can follow the contour of the pulley 7.

The baffle plates 25 and 26 can be placed in the flow of the fluid, preferably essentially parallel to or slightly traversing the direction of the fluid flow. Through a suitable positioning of the baffle plates in the transmission housing 11, the fluid can be forced in a certain direction, for example to a discharge opening, as a result of which good discharge is achieved.

Figure 4:
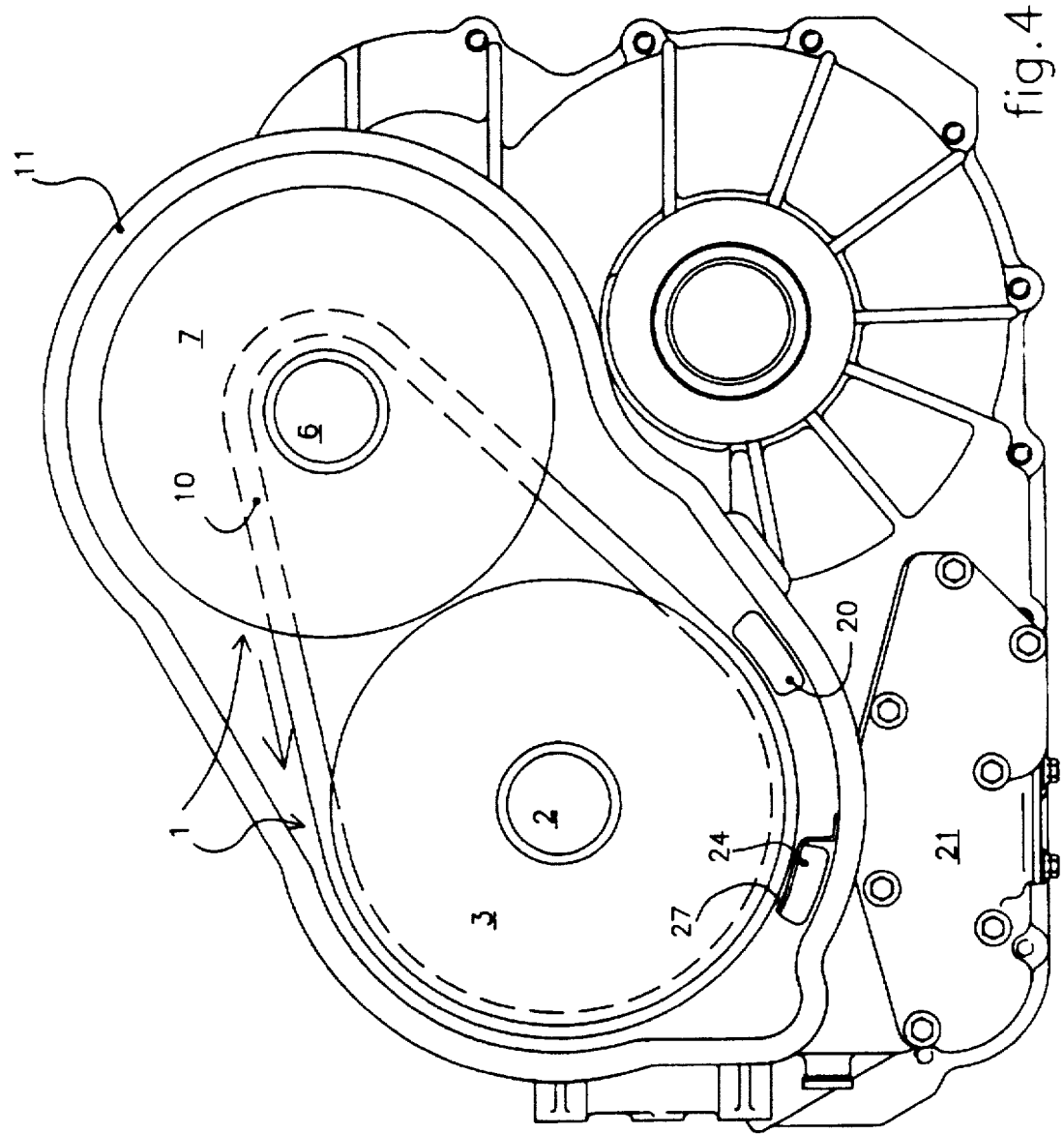
FIG. 4 shows a third embodiment of a continuously variable transmission according to the invention, illustrated diagrammatically in section and in side view.

FIG. 4 shows yet another embodiment of the invention. In this case a baffle plate 27 is provided near the discharge opening 24. The fluid which collects in the bottom of the transmission housing 11 and is in danger of being carried along by the primary pulley 3 and the drive belt 10 is thus intercepted by the baffle plate 27 and guided into the discharge opening 24 for discharge to the reservoir 21. The baffle plate 27 thus acts as a trap for the fluid which has collected in the transmission housing 11.

Figure 5:
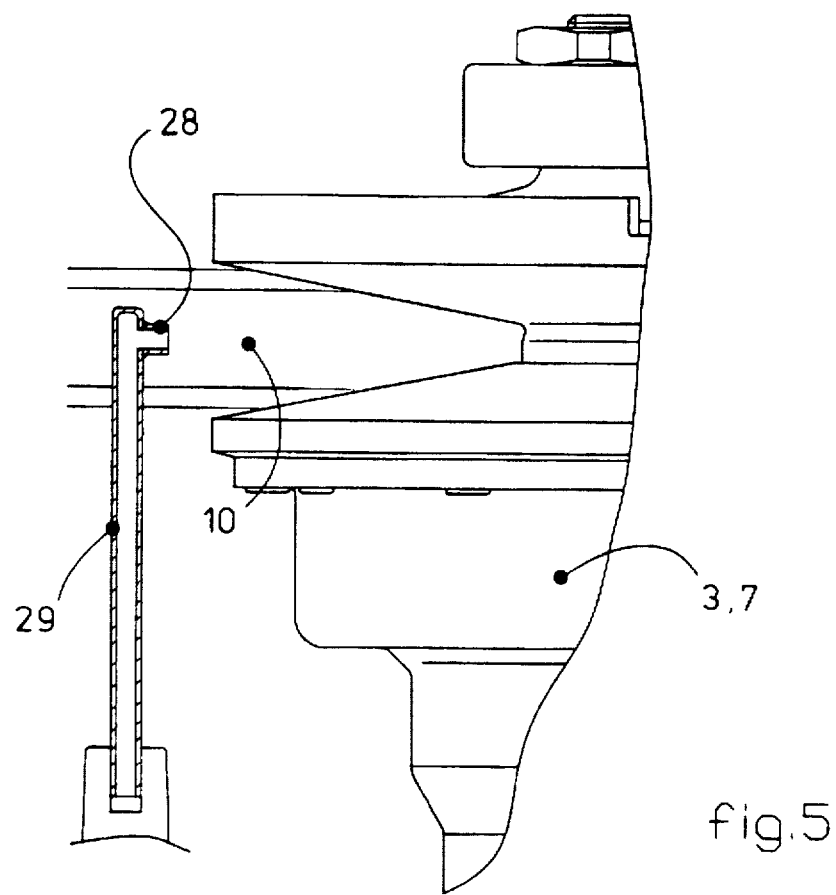
FIG. 5 shows a fourth embodiment of the invention, illustrated in side view.

In FIG. 5 a baffle plate 28 according to the invention is provided around the open end of the supply opening 29. The supply opening 29 is directed downwards and serves for the supply of fluid for lubrication of the drive belt 10, which in FIG. 5 runs over one of the pulleys 3 or 7. The baffle plate 28 prevents the fluid leaving the supply opening 29 from atomizing and thus being spread through the transmission housing 11, and makes it easier for the fluid to leave the supply opening 29 and be guided in the transmission housing 11 in concentrated form, so that the discharge of fluid is improved.

It will be clear that the invention is not restricted to the embodiments shown, and that within the scope of the invention many variants and combinations of variants which are considered to lie within the inventive idea are conceivable. For example, one or more grooves can be provided in the inside of the transmission housing 11 in such a way that they end near a discharge opening. The fluid guided by way of the grooves can be discharged directly to the reservoir 21. The baffle plate which follows the contour of one of the pulleys can also be combined with a discharge opening. The fluid carried along by the pulley is guided by the baffle plate in the direction of the discharge opening, with the result that rapid and good discharge of fluid is guaranteed.

We claim:

1. Continuously variable transmission, comprising a transmission housing which accommodates a pulley/belt unit, a hydraulic circuit providing at least one of control and lubrication of the transmission, and a fluid reservoir, and which is provided with one or more discharge openings near a bottom part of the transmission housing for discharge of fluid from the transmission housing to the fluid reservoir, wherein the transmission is provided with means for promoting a flow of fluid towards said bottom part of said transmission housing from other parts of the transmission housing.

2. Continuously variable transmission according to claim 1, characterized in that the means break through and/or influence the flow of fluid.

3. Continuously variable transmission according to claim 1, characterized in that the means are fitted at the position where the possibility of volume build-up of fluid exists.

4. Continuously variable transmission according to one of claim 1, characterized in that the means comprise one or more additional discharge openings in the transmission housing.

5. Continuously variable transmission according to claim 1, characterized in that the means comprise a baffle plate which is fitted near an opening of the hydraulic circuit, wherein said baffle plate is separate from structure defining said fluid reservoir.

6. Continuously variable transmission according to claim 5, characterized in that the opening is a discharge opening for fluid from the transmission housing.

7. Continuously variable transmission according to claim 5, characterized in that the opening is a supply opening for fluid for lubrication of the drive belt.

8. Continuously variable transmission according to claim 1, characterized in that the means permit counterflow in the opposite direction to a volume build-up of fluid, wherein said means is separate from structure defining said fluid reservoir.

9. Continuously variable transmission according to claim 8, characterized in that the means comprise a baffle plate.

10. Continuously variable transmission according to claim 9, characterized in that the baffle plate is fitted in the fluid flow, essentially parallel to or slightly traversing the direction of the fluid flow.

11. Continuously variable transmission according to claim 9, characterized in that the baffle plate is fitted between the drive belt and the transmission housing, where the drive belt does not run over the pulleys.

12. Continuously variable transmission according to claim 9, characterized in that the baffle plate is fitted between at least one pulley of the pulley/drive belt unit and the transmission housing.

13. Continuously variable transmission according to claim 12, characterized in that the baffle plate follows the contour of the pulley.

14. Continuously variable transmission according to claim 1, characterized in that the means comprise one or more grooves in the transmission housing.

15. Continuously variable transmission according to claim 1, characterized in that the means comprise a pump.

* * * * *